(12) United States Patent
Rockman et al.

(10) Patent No.: US 11,769,104 B2
(45) Date of Patent: Sep. 26, 2023

(54) AUTONOMOUS VEHICLE DELIVERY SYSTEM

(71) Applicant: AutoGuide, LLC, Chelmsford, MA (US)

(72) Inventors: Jeremy Rockman, Chelmsford, MA (US); Robert Sullivan, Chelmsford, MA (US); Justin Holwell, Chelmsford, MA (US)

(73) Assignee: AUTOGUIDE, LLC, Chelmsford, MA (US)

( * ) Notice: Subject to any disclaimer, the term of this patent is extended or adjusted under 35 U.S.C. 154(b) by 131 days.

(21) Appl. No.: 16/904,967

(22) Filed: Jun. 18, 2020

(65) Prior Publication Data
US 2021/0398070 A1 Dec. 23, 2021

(51) Int. Cl.
*G06Q 10/0832* (2023.01)
*G06Q 10/0835* (2023.01)
*G06Q 10/083* (2023.01)
*G06Q 10/087* (2023.01)
*G05D 1/02* (2020.01)
(Continued)

(52) U.S. Cl.
CPC ... *G06Q 10/0832* (2013.01); *B60W 60/00256* (2020.02); *G05D 1/0274* (2013.01); *G05D 1/0278* (2013.01); *G06Q 10/087* (2013.01); *G06Q 10/0838* (2013.01); *G06Q 10/08355* (2013.01); *H04W 4/80* (2018.02)

(58) Field of Classification Search
CPC ......... G06Q 10/0832; G06Q 10/08355; G06Q 10/0838; G06Q 10/02; G06Q 10/087
See application file for complete search history.

(56) References Cited

U.S. PATENT DOCUMENTS 9,552,564 B1 1/2017 Martenis
10,102,855 B1 * 10/2018 Sindhwani ............ G06F 40/134
(Continued)

FOREIGN PATENT DOCUMENTS

WO 2019023518 A1 1/2019

OTHER PUBLICATIONS

Holley, P., "Domino's will start delivering pizzas via an autonomous robot this fall," Jun. 17, 2019, The Florida Times-Union, retrieved from https://www.jacksonville.com/story/news/2019/06/17/dominos-will-start-delivering-pizzas-via-autonomous-robot-this-fall/4890101007/ (Year: 2019).*

(Continued)

*Primary Examiner* — Rupangini Singh
*Assistant Examiner* — Bryan J Kirk
(74) *Attorney, Agent, or Firm* — Burns & Levinson LLP (57) ABSTRACT

An example system includes a computing system having computer memory storing instructions that are executable and one or more processing devices for executing the instructions to perform operations that include receiving data from a user device that identifies goods, and generating information representing the goods based on the data. Bins are configured to hold the good represented by the information. The bins are climate-controllable to accommodate the goods. An autonomous vehicle is configured to transport the bins. The autonomous vehicle is configured to navigate from a loading station where at least some of the goods are received in the bins to a pick-up station where the goods are released from the bins.

34 Claims, 5 Drawing Sheets

(51) Int. Cl.
*H04W 4/80* (2018.01)
*B60W 60/00* (2020.01)

(56) References Cited

U.S. PATENT DOCUMENTS

| | | | |
|---|---|---|---|
| 10,310,500 B1* | 6/2019 | Brady | G05D 1/0291 |
| 10,538,190 B1* | 1/2020 | Metellus | A47B 96/00 |
| 11,040,828 B1* | 6/2021 | Ward | G01C 21/20 |
| 2002/0032573 A1* | 3/2002 | Williams | G06Q 10/083 705/335 |
| 2008/0011775 A1* | 1/2008 | Arisman | B28C 7/12 700/240 |
| 2008/0201155 A1* | 8/2008 | Som | A47F 10/00 705/1.1 |
| 2010/0076591 A1 | 3/2010 | Lert, Jr. et al. | |
| 2010/0676591 | 3/2010 | Lert, Jr. et al. | |
| 2012/0058707 A1* | 3/2012 | Finwall | A63H 17/38 446/465 |
| 2014/0067618 A1* | 3/2014 | Zhang | G06Q 10/0836 705/26.81 |
| 2015/0006005 A1* | 1/2015 | Yu | G06Q 50/28 701/22 |
| 2015/0178676 A1* | 6/2015 | Carr | G06Q 10/0836 705/332 |
| 2015/0186869 A1* | 7/2015 | Winters | G06Q 50/28 705/26.81 |
| 2017/0115125 A1 | 4/2017 | Outwater et al. | |
| 2017/0278063 A1* | 9/2017 | Dixon | G06K 7/1413 |
| 2018/0031296 A1* | 2/2018 | Winkle | F25D 3/125 |
| 2018/0285653 A1* | 10/2018 | Li | G06V 20/52 |
| 2018/0300676 A1* | 10/2018 | Peterson | G06Q 10/0832 |
| 2019/0031075 A1 | 1/2019 | Koch | |
| 2019/0050952 A1* | 2/2019 | Goldberg | A47J 36/32 |
| 2019/0283962 A1* | 9/2019 | Skaaksrud | G06Q 10/0875 |
| 2019/0370744 A1* | 12/2019 | Fee | E05B 65/025 |
| 2020/0102147 A1 | 4/2020 | Sullivan et al. | |
| 2020/0103882 A1 | 4/2020 | Sullivan et al. | |
| 2020/0104761 A1* | 4/2020 | Aich | G06Q 20/322 |
| 2020/0183414 A1* | 6/2020 | Shih | G06Q 10/0832 |
| 2020/0250611 A1* | 8/2020 | Pourteymour | G06F 9/542 |
| 2020/0258037 A1* | 8/2020 | Ramos | G06Q 10/0835 |
| 2020/0324974 A1* | 10/2020 | Gorman | G06Q 10/06315 |
| 2020/0402003 A1* | 12/2020 | ElShenawy | G01C 21/20 |
| 2021/0065107 A1* | 3/2021 | Jajula | G06Q 30/0635 |
| 2021/0201380 A1* | 7/2021 | Belcher | G06Q 30/0641 |
| 2021/0295258 A1* | 9/2021 | Takebayashi | G08G 1/096708 |
| 2022/0003493 A1* | 1/2022 | Park | G06Q 10/087 |
| 2022/0051178 A1* | 2/2022 | Han | G06Q 10/087 |

OTHER PUBLICATIONS

U.S. Appl. No. 62/738,697, filed Sep. 28, 2018, (73 pages).
U.S. Appl. No. 62/738,800, filed Sep. 28, 2018, (62 pages).
International Search Report for International Application No. PCT/US2021/036831, dated Sep. 9, 2021, (5 pages).
Written Opinion for International Application No. PCT/US2021/036831, dated Sep. 9, 2021, (5 pages).
International Search Report for PCT Application No. PCT/US2021/036831, dated Sep. 9, 2021, (5 pages).
Written Opinion for PCT Application No. PCT/US2021/036831, dated Sep. 9, 2021, (5 pages).
International Preliminary Report on Patentability for PCT Application No. PCT/US2021/036831, dated Dec. 13, 2022, (6 pages).

* cited by examiner

AUTONOMOUS VEHICLE DELIVERY SYSTEM

TECHNICAL FIELD

This specification relates generally to examples of an autonomous vehicle delivery system.

BACKGROUND

Autonomous vehicles, such as mobile robots, are configured to travel within or between spaces, such as an indoor environment or an outdoor environment. Such vehicles are autonomous in the sense that they do not require an on-board operator to control their movement. Instead, an on-board computing system or a remote computing system may control the vehicle's movements.

SUMMARY

An example system includes a computing system comprised of computer memory storing instructions that are executable and one or more processing devices for executing the instructions to perform operations that include receiving data from a user device that identifies goods and generating information representing the goods based on the data. Bins are configured to hold the good represented by the information. The bins may be climate-controllable to accommodate the goods. To implement climate control over the bins, the climate of the interior of a structure, such as a trailer, that houses the bins may be controlled. An autonomous vehicle is configured to transport the bins. The autonomous vehicle is configured to navigate from a loading station where at least some of the goods are received in the bins to a pick-up station where the goods are released from the bins. The example system may include one or more of the following features, either alone or in combination.

The system may include a display device associated with the bins and the operations performed by the one or more processing devices may include associating a unique identifier with the goods and outputting data representing the unique identifier to the display device for rendering the unique identifier on the display device.

The system may include a scanner to read graphical codes and the operations performed by the one or more processing devices may include generating data representing a graphical code, where the graphical code is associated with the goods, and outputting the data representing the graphical code to the user device. The bins may be unlockable using the graphical code. In this regard, the scanner may be configured to read the graphical code from the user device and to control the bins to unlock in response to reading the graphical code. The system may include a proximity reader to read data from a device and the operations performed by the one or more processing devices may include generating data representing a near-field communication (NFC) tag that is associated with the goods and sending the data representing the NFC tag to the user device. The bins may be unlockable using the NFC tag. In this regard, the proximity reader may be configured to read the NFC tag from the user device and to control the bins to unlock in response to reading the NFC tag. The system may include a card reader to read information encoded on a physical or virtual card that is provided to the user or that is represented on the user's device. The card reader may be configured to read the information from the card and to control the bins to unlock in response to reading the information from the card. The operations performed by the one or more processing devices may include identifying a location of the user device based on GPS data and controlling locked bins to unlock based on the GPS data; that is, based on the user's proximity to the bins.

The operations performed by the one or more processing devices may include outputting, to the user device, data for an application that is executable on the user device to produce a graphical display. Data received from the user device may identify goods identified in the application. Data received from the user device may identify a volume to accommodate the goods. The operations may include outputting, to the application, data indicating whether the volume is sufficient to accommodate the goods. The user device may include a mobile device that is independent of an enterprise containing the loading station and the pick-up station. The user device may be a component of an enterprise containing the loading station and the pick-up station.

Climate control of the bins may include temperature control such that at least two adjacent or non-adjacent bins are maintained at different temperatures, with at least one bin being maintained at a temperature to accommodate perishable goods and at least one bin being maintained at a temperature to accommodate non-perishable goods. Climate control of the bins may include temperature control such that a first bin among the bins is maintained at ambient temperature, a second bin among the bins is refrigerated, and a third bin among the bins is maintained at or below 0° Celsius. Climate control of the bins may include humidity control. At least one of the bins may be associated with a temperature detector and a refrigeration system. The refrigeration system may be controllable based on the temperature detected by the temperature detector. To implement climate control over the bins, the climate of the interior of a trailer that holds the bins may be controlled.

The system may include a trailer to hold the bins. The autonomous vehicle may be connected to the trailer to move the trailer and the bins from the loading station to the pick-up station. A first bin may be above a second bin in the trailer and the second bin may be above a third bin in the trailer. Each bin may include a door to access goods therein. The door may include a sensor to detect that the door is closed. The sensor may be configured to output a signal when the door is closed to indicate that the goods have been released. The trailer may include protection from the environment.

Navigation from the loading station to the pick-up station may be performed, at least in part, using a global positioning system (GPS). Navigation from the loading station to the pick-up station may be performed, at least in part, by reference to a map stored in computer memory. The map may be of at least part of space to be traversed between the loading station and the pick-up station and may include reference points within the space. The loading station may be one of multiple loading stations. Prior to navigating to the pick-up station, the autonomous vehicle may be controlled to navigate to the multiple loading stations to pick-up the goods from the multiple loading stations. The application that is executable on the user device may enable specifying locations associated with or of the multiple loading stations. The system may also include receiving data representing the locations from the application.

A loading station may include robotics to put goods in at least some of the bins. A first loading station among multiple loading stations may be automated for putting goods in at least some of the bins and a second loading station among the multiple loading stations may be manual for putting goods in at least some of the bins. A loading station may be in-store and a pick-up station may be outside of a store. The pick-up station may be at a customer residence. A loading station may be associated with a retail store and a pick-up station may be curbside or outdoors. The autonomous vehicle may include wheels having rugged tread tires configured for outdoor travel.

The operations performed by the one or more processing devices may include outputting data representing a scheduled pick-up time to the application on the user device and receiving confirmation of the scheduled pick-up time from the user device. The operations performed by the one or more processing devices may include maintaining a record that includes failure of a customer associated with the user device to obtain the goods at the scheduled pick-up time. The graphical display of the application executed on the user device may be configured to enable a user to select a pick-up station among multiple pick-up stations. Data representing the pick-up station may be received by the system and may be usable for navigation from the loading station to the pick-up station. The graphical display of the application executed on the user device may be configured to provide alternatives to the goods based on availability of the goods. The graphical display of the application executed on the user device may be configured to receive images of the goods. The data received from the user device that identifies goods may include the images or data based on the images.

The operations performed by the one or more processing devices may include allocating a number of the bins needed for the goods based on data received from the user device that identifies goods. Allocating the number of bins may also be based on one or more rules that are definable by an administrator.

Any two or more of the features described in this specification, including in this summary section, can be combined to form implementations not specifically described herein.

The example systems and techniques described herein, or portions thereof, can be implemented using, or controlled by, a computer program product that includes instructions that are stored on one or more non-transitory machine-readable storage media, and that are executable on one or more processing devices to control (e.g., to coordinate) the operations described herein. The example systems and techniques described herein, or portions thereof, can be implemented using an apparatus or electronic system that can include one or more processing devices and memory to store executable instructions to implement various operations.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Described herein are examples of systems and techniques for delivering goods using an autonomous vehicle. An example system includes a computing system, bins to hold goods for delivery, and an autonomous vehicle to transport the bins from a loading station where the goods are received in the bins to a pick-up station where the goods are released from the bins. The computing system is configured—for example, programmed—to receive orders from a customer through an application ("app") installed on the customer's mobile device, e.g., a smartphone. The orders may be fulfilled at the loading station by putting goods that were ordered into the bins. The bins may be climate controlled to accommodate different types of goods. For example, a bin to hold non-perishable goods may be at ambient temperature, a bin to hold perishable goods may be refrigerated, and a bin to hold frozen goods may be maintained at or below freezing temperature such as 0° Celsius. To implement climate control, the climate of the structure that houses the bins may be controlled. The autonomous vehicle may then navigate from the loading station to a pick-up station. The pick-up station may be curbside or in a store's parking lot, for example. The bins may be locked until they reach the pick-up station. The bins may be unlocked using the customer's mobile device or other mechanism. After the bins are unlocked, the customer may transfer the goods to their car or other receptacle and close the bins. Closing the bins signals to the computing system that the goods have been released—that is, picked-up.

The preceding system may enable delivery of goods to a customer without requiring the customer to enter a store or other facility to purchase the goods or to collect the goods. Purchase and delivery may be completely contactless; that is, without the customer coming face-to-face with an employee. This may be more convenient for the customer and may reduce the spread of disease.

The computing system described above may include a central computing system. The central computing system may include, for example, one or more microcontrollers, one or more microprocessors, programmable logic such as a field-programmable gate array (FPGA), one or more application-specific integrated circuits (ASICs), solid state circuitry, or any appropriate combination of two or more of these types of processing devices. In some implementations, components of the central computing system may communicate with a control system that controls operation of one or more autonomous vehicles. The central computing system and the control system may be combined in a single computing system in some cases. This central computing system is configured—for example, programmed—to output data for the app to the customer's mobile device, to communicate with the app to receive orders and payment, to send notifications to the customer, to implement scheduling, and to coordinate any activities associated with fulfilling an order such as instructing which goods to pack and instructing movement of an autonomous vehicle.

Figure 1:
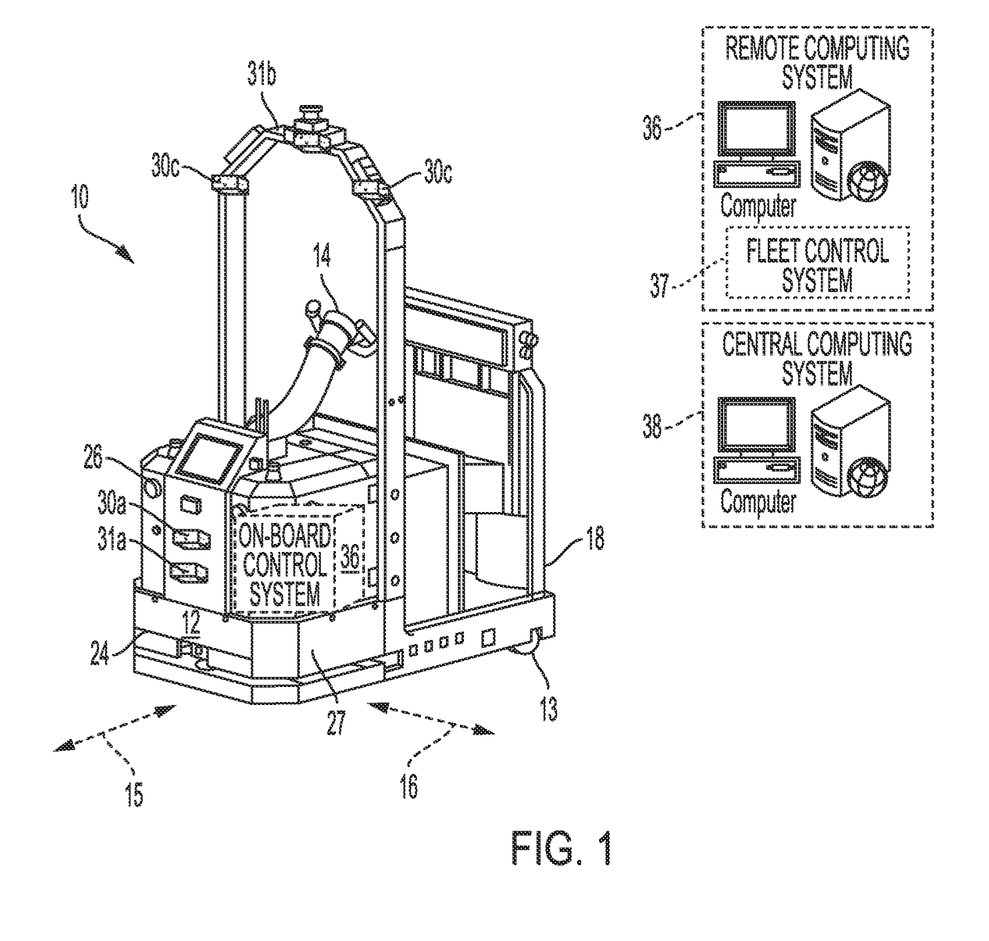
FIG. 1 is a diagram of an example autonomous vehicle and computing systems that may be used to implement the automated delivery techniques described herein.

Autonomous vehicles used as examples herein include mobile robots ("robots"); however, any appropriate type of autonomous vehicle may be used including, but not limited to, self-driving machinery, self-driving automobiles, and self-driving trucks. An example robot, includes a body configured for movement along a surface such as an indoor floor or outdoor pavement or ground. FIG. 1 shows an example of such a robot 10. In this example, robot 10 is autonomously-controllable even though it includes a mechanism 14 for manual control. In an example, autonomously-controllable includes the robot moving of its own accord based on sensor inputs and, in some cases, inputs from a remote system such as a fleet control system. Robot 10 includes a body 12 having wheels (one visible labeled 13) to enable robot 10 to travel across different types of terrain. For example, the wheels may include tires that have a rugged tread that enable both indoor and outdoor travel. The tires may have large tread blocks that extend to their sides and also have generous grooves. Generally, the larger the tread blocks are on a tire, the better grip the tires will have on non-uniform terrain. In this example, the robot is configured to move forward and backwards as represented by arrow 15 and is configured to turn in the directions of arrow 16.

Figure 2:
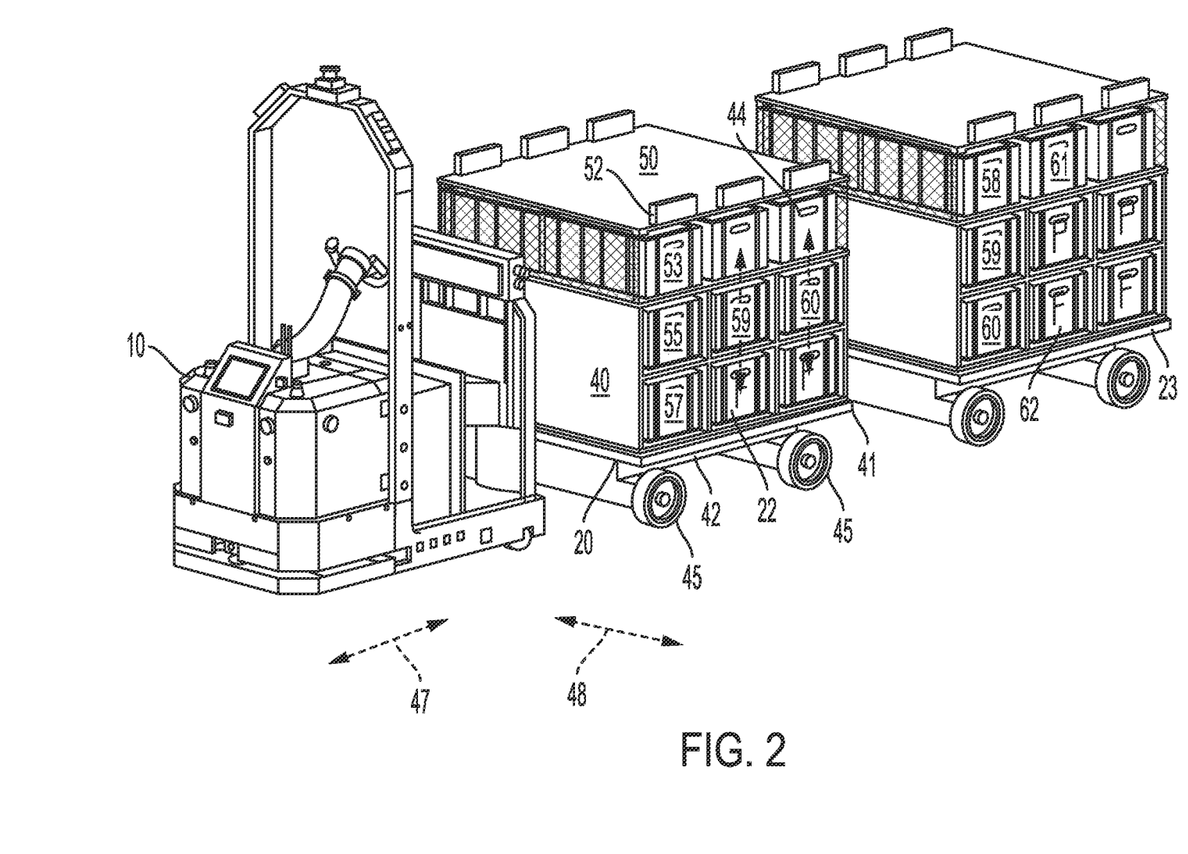
FIG. 2 is a diagram of the autonomous vehicle of FIG. 1 and trailers connected thereto for carrying bins holding goods to be delivered.

Robot 10 also includes a trailer hitch (not shown) at its back side 18. Back side 18 is the side of the robot that is opposite to the direction of forward travel. The trailer hitch enables connection to a trailer 20 shown in FIG. 2, which holds bins 22. As shown in FIG. 2 multiple trailers 20 and 23 may be connected in a daisy-chain configuration allowing robot 10 to pull multiple trailers at the same time. Example configurations of the bins and the trailer are described in more detail below.

Robot 10 may include multiple sensors. The sensors may include one or more 3D (three dimensional) cameras, one or more light detection and ranging (LIDAR) scanners, one or more optical sensors, one or more sonar sensors, one or more time-of-flight (TOF) sensors, one or more radar sensors, one or more 2D (two dimensional) cameras, one or more ultrasonic sensors, or any appropriate numbers and/or combination thereof. The robot is not limited to these types of sensors.

In an example, robot 10 includes one or more 3D cameras facing a front 24 of the robot. The front of the robot faces the direction of forward travel of the robot. In the example of FIG. 1, front 24 of robot 10 may include an arc spanning 180° or less from one side 26 of robot 10 to the opposite side 27 of robot 10. In this example, three 3D cameras 30a, 30b, 30c are shown. A 3D camera may capture, red, green, blue, and depth (RGBD) data. In an example, robot 10 may also include multiple LIDAR scanners 31a, 31b facing front 24 of the robot. Each LIDAR scanner is configured to detect objects within a sensing plane. Two or more LIDAR scanners may be configured and arranged to obtain 2D data in orthogonal sensing planes. This 2D data, when appropriately correlated and/or combined constitutes 3D information obtained from the front of the robot. Combinations of these and/or other sensors may be used to obtain 3D data representing the space in front of the robot. The 3D data may include 3D (e.g., Cartesian XYZ) coordinates representing the space. Scanners, cameras, and sensors may be placed at locations in addition to, or other than, the locations shown in FIG. 1.

In this regard, robot 10 may include additional sensors at locations other than the front of the robot. For example, sensors of the type described herein may be included on one or both sides 26, 27 of robot 10 and/or on back 18 of robot 10. In the example of FIG. 1, back 18 of the robot includes an arc spanning 180° or less from one side 26 of robot 10 to opposite side 27 of robot 10. In the example of FIG. 1, sides 26, 27 of the robot include an arc spanning 180° or less from the direction of travel of the robot to the direction opposite to the direction of travel of the robot. These sensors may assist in operations such as object detection and localization.

LIDAR scanners, 3D cameras, and/or other sensors constitute a vision system for the robot. Visual data obtained by the vision system may be used to determine a location of the robot within a space being traversed, including indoor and outdoor spaces. In this regard, in some implementations, a robot control system 36 stores a map of the space to be traversed in computer memory. Components of control system 36 are shown in dashed lines in FIG. 1 because at least part of the control system may be internal to the robot. The map may be located on the robot or at any location that is accessible to the control system. The map may include locations of landmarks, such as columns, corners, walls, poles, trees, and other distinguishable features of the space that act as references for the robot. The map may include dimensions and distinguishing characteristics, such as color, shape, texture, and so forth of those landmarks and other distinguishable features of the space that act as references for the robot. The map may also include measurements indicating the size of the space, measurements indicating the size and locations of the landmarks, measurements indicating distances between landmarks, and coordinate information identifying where the landmarks are located in the space. The control system uses information in the map to move throughout the space and uses visual data from the vision system and data from the map to determine a location of the robot within the space. For example, the robot may identify the locations of three landmarks within the space. By knowing where the robot is relative to these landmarks, the locations of the landmarks on the map and thus within the space, and the distances between the landmarks, the control system can determine the location of the robot within the space.

In some implementations, an on-board control system on the robot may use a pre-planned route through the map to reach locations of the loading station where the goods are received in the bins and the pick-up station where the goods are released from the bins. In some implementations, robot 10 may include a global positioning system (GPS) device for receiving GPS data representing a location of the robot. The GPS data may also be used for navigation, particularly in outdoor spaces. In some implementations, GPS coordinates may be associated with locations on the map. GPS data received by the robot from a GPS system may be used to navigate through a route on the map. In some implementations, the map may be used for navigation through indoor spaces and the GPS data may be used to navigate through outdoor spaces. For example, in a case where the pick-up station is outdoors, the pick-up station may be assigned GPS coordinates. Upon leaving an indoor space, such as a retail store, the control system may rely on GPS guidance to reach the pick-up station.

Sensors on the robot such as those described herein may be used to avoid obstacles in the robot's path both indoors and outdoors. For example, the sensors may be configured to continuously detect distances between the robot and objects in a vicinity of the robot. This may be done in order to avoid collision and to guide the robot safely around or between detected objects along a route. While the robot is moving along a route (whether it be map-based or GPS-based), an on-board computing system may continuously receive input from the sensors. If an obstacle is blocking the trajectory of the robot, the on-board computing system is configured to plan a path around the obstacle. If an obstacle is predicted to block the trajectory of the robot, the on-board computing system is configured to plan a path around the obstacle.

Control system 36 may include circuitry and/or an on-board computing system to control operations of the robot.

The circuitry or on-board computing system is "on-board" in the sense that it is located on the robot itself. The control system may include, for example, one or more microcontrollers, one or more microprocessors, programmable logic such as an FPGA, one or ASICs, solid state circuitry, or any appropriate combination of two or more of these types of processing devices. In some implementations, on-board components of the control system may communicate with a remote computing system. This computing system is remote in the sense that it is not located on the robot itself. For example, control system 36 can also include computing resources distributed to a remote—for example, a centralized or cloud—service, at least a portion of which is not on-board the robot. Commands provide by the remote computing system may be transferred for execution by the on-board computing system. In some implementations, control system 36 includes only on-board components. In some implementations, control system 36 includes a combination of on-board components and the remote computing system. In some implementations, control system 36 may be configured—for example programmed—to implement control functions and robot movement absent either local or remote input from a person. In some implementations, control system 36 may be configured to implement control functions, including localization, based at least in part on input from a person.

In some implementations, the remote control system that is part of robot control system 36 may include a fleet control system 37. The fleet control system may include one or more computing devices that operate together to control, to influence, or to instruct multiple robots of the type described herein. The fleet control system may be configured to coordinate operations of multiple robots, including instructing movement of a robot to loading station or a pick-up station. For example, the fleet control system may instruct robots to coordinate operations to meet system-defined delivery schedules. In this example, the system may instruct a first robot to bring empty bins from the pick-up station to the loading station and, contemporaneously, instruct a second robot having full bins to travel to the pick-up station to replace the first robot.

In some implementations, fleet control system 37 may store, maintain, and update a map of a space in which the robot or robots are to operate. The map may be accessed by each robot through the fleet control system or the map may be downloaded periodically, intermittently, or sporadically to all or some robots operating in the space. In some implementations, control system 36, including the remote portions thereof, may be distributed among multiple robots operating in the space. For example, one of the robots may receive the map—for example, from a fleet controller—and distribute the map to robots operating locally within the space. Similarly, one or more robots within the space may send command and control signals to other robots.

The central computing system 38 that executes operations to implement delivery of goods using an autonomous vehicle may be part of, or may be in communication with, the robot's control system 36 to, among other things, ensure that the robots reach their intended destinations and meet delivery schedules. For example, central computing system 38 may generate a delivery schedule and send that delivery schedule to the robot's control system, along with locations of the loading station and the pick-up station. The robot's control system 36 and the central computing system 38 may be in continuous, periodic, or intermittent communication to ensure that tasks required to obtain and to deliver goods on-schedule are carried-out and coordinated.

Referring back to FIG. 2, trailer 20 may include a connector (not shown) on its front 24 to connect to the trailer hitch on robot 10. All of the trailers may have the same or similar structure and function, although the number of bins carried by different trailers may vary. Accordingly, only trailer 20 is described in detail. Trailer 20 also may include a trailer hitch (not shown) on its back 41 to enable connection to another trailer 23. Trailer 20 also includes compartments 42 for holding bins 22. In the example of FIG. 2, there are six compartments 42 for holding six bins. However, a trailer may include any appropriate number of compartments. The trailer in this example may also hold three additional bins 44 above the six compartments. Trailer 20 also includes wheels 45 having tires that have a rugged tread to enable both indoor and outdoor travel. The tires may have large tread blocks that extend to their sides and also have generous grooves. In this example, the trailer 20 is configured to move forward and backwards as represented by arrow 47 and is configured to turn in the directions of arrow 48. Accordingly, trailer 20 and trailer 23 connected thereto move with robot 10.

The bins may align vertically as shown in FIG. 2. For example, each vertical column of bins may be for an order of goods from the same customer. A roof 50 covers the bins and connects to the base of the trailer behind the bins. Roof 50 includes a graphical display 52 above a column of bins. As shown in FIG. 2, there may a separate graphical display above each column of bins. The graphical displays may be individually controllable to display information about the order contained in the bins in the column below the graphical display. For example, the graphical display may be configured to render and to display a unique identifier associated with goods stored in a column of bins underneath the graphical display. The unique identifier may be associated with a customer order/goods by central computing system 38, which also may output data to the graphical display to render the unique identifier on the graphical display. The unique identifier may be alphanumeric and may or may not contain symbols. The unique identifier may be a code such as a barcode or a QR code that may be read by a mobile device such as smartphone. A customer may identifier their order by reading the unique identifier. The content of graphical display may be set by central computing system 38 and/or by the robot's control system 36 wirelessly or through a wired connection. In some implementations, the graphical display may be set manually, for example, by a person loading goods in to the bins.

Trailer 20 may include a power source (not shown), such as one or more batteries. In this regard, as described below, all or some of bins 22 may be climate-controlled. In some examples, climate control may be implemented by controlling the climate inside the structure—for example, the trailer—that holds or houses the bins. For example, a trailer may be environmentally sealed (not shown in FIG. 2) and segregated into different regions or compartments that each holds one or more bins. Those regions or compartments may be climate controlled separately in order to maintain bins within the trailer at different climates. For example, one or more refrigeration units, one or more heating units, one or more humidifiers, and/or one or more dehumidifiers may be contained on the trailer and used to control climates in regions or compartments of the trailer independently, thereby controlling the climates in the individual bins and enabling neighboring bins to be controlled differently. The refrigeration unit(s), heating unit(s), humidifier(s), and/or dehumidifier(s) may be placed proximate to or within the regions or compartments of the trailers containing the bins.

Power to run, for example, a refrigeration unit, a heating unit, a humidifier, and/or a dehumidifier to implement climate control in one or more of the bins is obtained through the power source on the trailer. In the case that the power source is one or more batteries, the batteries may be rechargeable. In some implementations, roof 50 may include solar panels (not shown) to recharge solar cells included in the batteries. The roof may be plastic covering that protects the goods from the elements. Solar panels may be incorporated into this plastic cover or mounted on the plastic cover.

As explained previously, the trailers may be climate-controlled in order to control the climates of the bins contained in the trailers. Climate control may include, for example, temperature control, humidity control, or both temperature and humidity control. Other types of climate control may also be implemented. In an example, at least two of the bins are actively maintained at different temperatures, with at least one bin being maintained at a temperature to accommodate perishable goods and at least one bin being maintained at a temperature to accommodate non-perishable goods. In another example, the climate control includes maintaining a top bin 53 in a column of bins at ambient temperature, refrigerating a middle bin 55 in the column (for example, between 40° Fahrenheit (4.4° Celsius) and 65° Fahrenheit (18.3° Celsius)), and a maintaining bottom bin 57 in the column at or below the freezing temperature of water at sea level, namely 32° Fahrenheit (0° Celsius). The bins may be arranged such that colder bins are at the bottom of a column and such that progressively warmer bins are stacked upwards in the column. The bins, however, may be arranged in other ways. For example, each column of bins may include same-temperature bins. In this example, a single customer order may include two columns 59, 60 of bins, which are represented using arrows to indicate all three bins are included in each respective column. The first column 59 may include all bins at freezing temperatures and the second column 60 may include all bins at refrigerated temperatures. In some implementations, refrigeration and freezing may be implemented using one or more heat pumps (now shown). The heat pumps may be located on the trailer or in the individual bins. In some cases, the bins are brought to temperature before transport with no subsequent temperature control prior to pick-up by the customer.

In some implementations, temperature control may also include heating one or more of the bins. For example, if the goods include prepared food, it may be necessary to maintain the goods at a certain minimum temperature. In this example, one more heating units may be included on the trailer or in the bins themselves to maintain the temperature of a bin at the minimum temperature.

One or more of the bins may include a temperature sensor that detects the outside (ambient) temperature and that sends that temperature to central computing system 38. Central computing system 38 may control the refrigeration and/or heating units adaptively based on the outside temperature detected by the temperature detector. For example, if the outside temperature is below freezing, there may be no need to expend energy to freeze a bin that requires freezing. Similarly, if the temperature outside is determined to be extremely hot (for example, 100° Fahrenheit (37.8° Celsius)), there may be no need to expend energy to heat a bin that requires heating. The refrigeration and/or heating units may be controlled using wireless signals transmitted over one or more computer networks, for example.

In some implementations, climate control may include humidity control. To add humidity to a bin, a humidifier may be included on the trailer or in the bin. To remove humidity from a bin, a dehumidifier may be included on the trailer or in the bin. Humidity control may be separate from, or augment, temperature control. Types of climate control other than those described herein may also be implemented. The humidifier and/or dehumidifier units may be controlled using wireless signals transmitted over one or more computer networks, for example.

Each bin may be locked after loading. The locks may be responsive to wired or wireless signals; for example bin door locks may be controllable to unlock in response to a wireless signal. The customer whose order is associated with the bins (and identified on the display device) is provided with a mechanism to unlock the bins. For example, one or more of the bins may include a scanner 58 configured to read graphical codes, such as a barcode or a QR code. Following placement of an order, central computing system 38 may generate data representing a graphical code associated with the order and output the data representing the graphical code to the customer's mobile device. To open the bin, the customer may position that code in front of the scanner and, when the code is authenticated, information is sent to the central computing system or the robot's control system to unlock one or more of the bins associated with the code. In some cases, the scanner may control the bin lock(s) directly; that is, without requiring communication to and from the central computing system. Unlocking a bin includes unlocking the door on the bin that opens and closes.

In some implementations, one or more of the bins may include a proximity reader 59 to read data from the customer's mobile device. For example, following placement of an order, central computing system 38 may generate data representing a near-field communication (NFC) tag that is associated with the order and send that data representing the NFC tag to the customer's mobile device. To open the bin, the customer places their mobile device near to the proximity reader. The proximity reader is configured to read the NFC tag from the mobile device and, when the NFC tag is authenticated information is sent to the central computing system or the robot's control system to unlock one or more of the bins associated with the NFC tag. In some cases, the proximity reader may control the bin lock(s) directly; that is, without requiring communication to and from the central computing system.

In some implementations, one or more of the bins may include a card reader 60 to read information encoded on a physical card having a chip or magnetic strip. The physical card may be issued to the customer to unlock the bins. In some cases, the card may be updated to contain data representing a new order. The card reader is configured to read the information from the physical card and, when the card data is authenticated information is sent to the central computing system or the robot's control system to unlock one or more of the bins associated with the card. in some cases, the physical card may control the bin lock(s) directly; that is, without requiring communication to and from the central computing system.

In some implementations, the customer may be provided with an alphanumeric code to enter into a keypad 61 associated with bins containing their order. When the correct code is entered, information is sent to the central computing system or the robot's control system to unlock one or more of the bins associated with the code. In some cases, the keypad may control the bin lock(s) directly; that is, without requiring communication to and from the central computing system.

In some implementations, the central computing system may identify the location of a customer using GPS data and control the bins to unlock automatically when the GPS data indicates that the customer is near to the pick-up station. For example, the central computing system may identify when the customer has entered a store parking lot and unlock the bins containing the customer's order at that time. In general, any appropriate mechanism may be used to unlock the bins manually or automatically.

Figure 3:
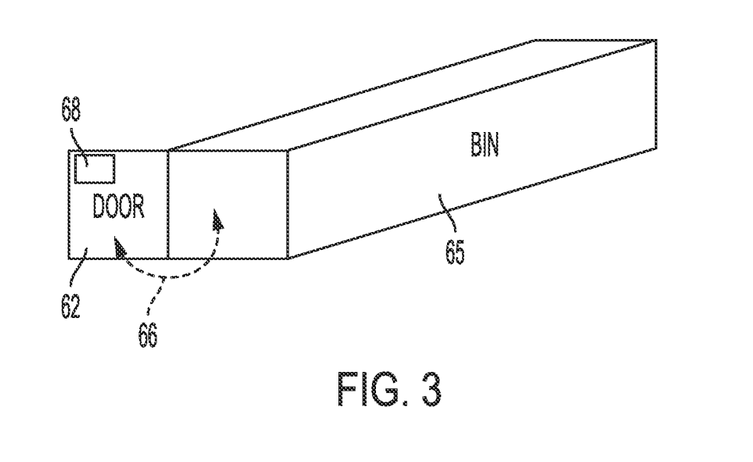
FIG. 3 is a block diagram of an example bin.

As noted, each bin may include a door, such as door 62, to access goods within the bin. Example bin 65 and door 62 are shown in FIG. 3. The door swings open and closed along arrow 66. Each door may include a contact sensor 68 to detect that the door is open or closed. Alternatively, the contact sensor may be mounted on the bin or components to implement the contact sensor may be on both the bin and the door. The sensor 68 may be configured to output a signal to central computing system 38 to indicate that the door has been closed after the door has been opened. This signal indicates, to the central computing system, that goods from bin 65 have been released to the customer. This information may be used to control movement of the robot, as described below. After a bin door is closed, the bin door may lock automatically. In some cases, the customer may signal through the app that the goods have been collected from the bin, rather than relying the door closure.

The goods to be loaded, transported, and delivered may include any appropriate type of items including those that are perishable or non-perishable. Perishable goods include food that is likely to spoil or decay quickly such as fruit, vegetables, butter, and eggs. Perishable goods may also include frozen foods and prepared (hot) foods. Perishable goods, however, are not limited to foodstuffs. For example, some medicines or medical products may require freezing or refrigeration. Likewise, it may be beneficial to protect some consumer electronics from extreme heat. Non-perishable goods may include anything that will not spoil or decay, at least within a time-span measured in single-digit days. For example, canned goods and dried pasta are often characterized as non-perishable. Non-perishable goods, however, are not limited to foodstuffs. For example, non-perishable goods may include utensils, furniture, clothing, and the like.

Figure 4:
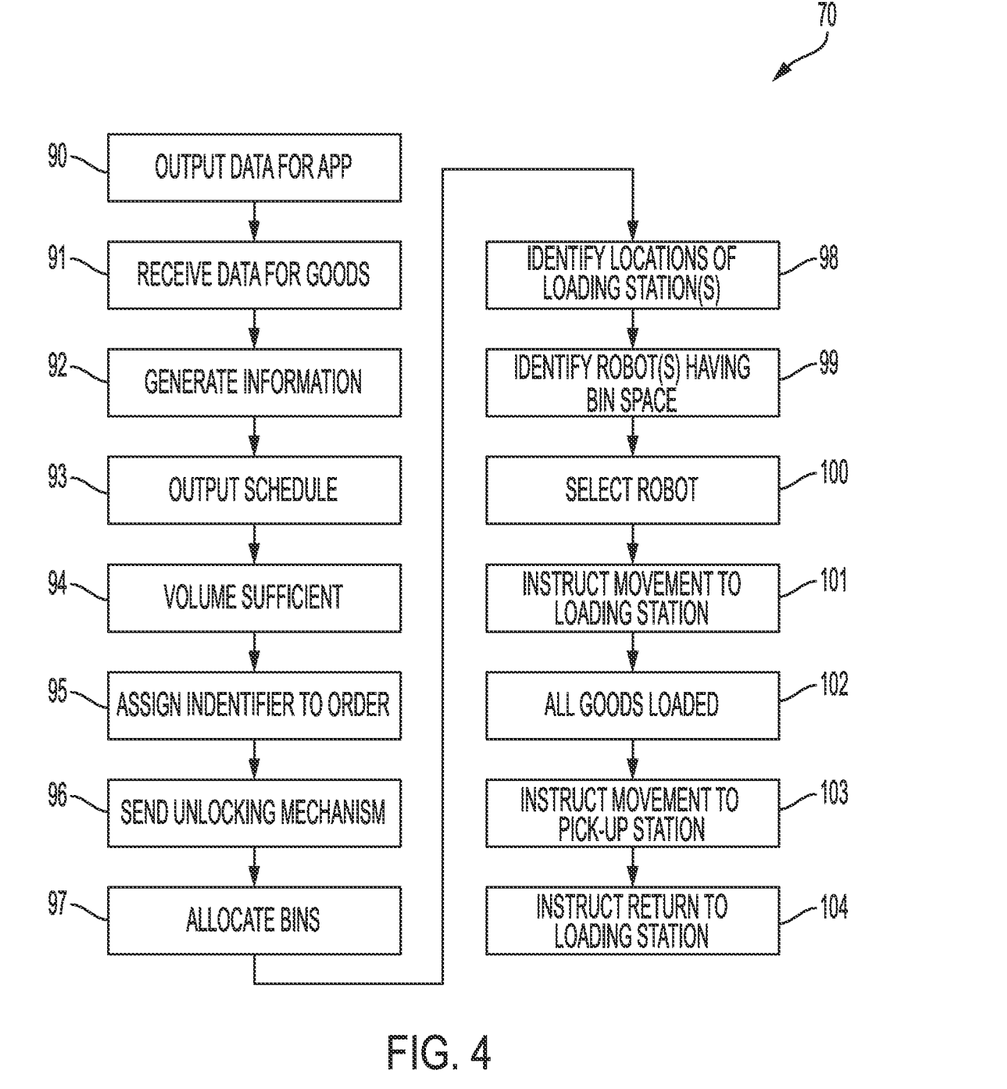
FIG. 4 is a flowchart showing example operations that may be performed to implement the automated delivery techniques described herein.
Figure 5:
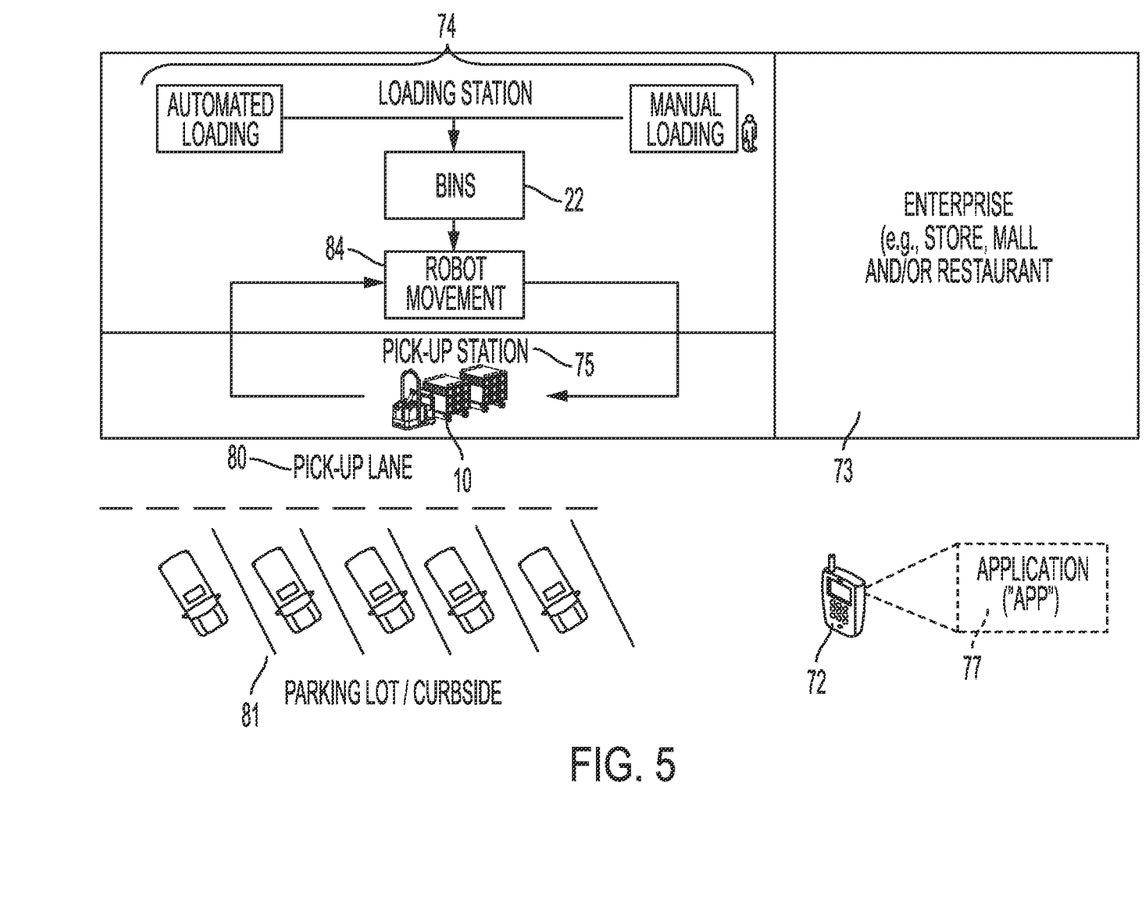
FIG. 5 is a plan diagram of an example space in which the automated delivery techniques described herein may be performed.

Example operations 70 for implementing delivery of goods using an autonomous vehicle are described with respect to FIGS. 4 and 5. The operations may be executed by central computing system 38 in combination with the robot's control system 36 and a user device 72; and the operations need not be performed in the order shown. The user device may be a customer's mobile device such as a smartphone. That is, the user device maybe independent of—for example, not owned by—an enterprise 73 such as a retail store, restaurant, or shopping mall associated with the loading station 74 and the pick-up station 75. In some implementations, the user device is a component of the enterprise associated with the loading station and the pick-up station. For example, the user device may be a kiosk inside or outside of a store pre-loaded with application software to perform all or some of the app functions described herein. In the following example, however, the user device is a customer mobile device.

To use the autonomous vehicle delivery system described herein, a customer downloads an app 77 onto their mobile device 72. For example, the customer may download the app over the Internet or other computer network from central computing system 38. In this regard, central computing system 38 may include a Web server that generates a Web page through which the customer may download the app. Interaction between the customer's mobile device and central computing system 38 may be implemented using Hyper-Text Transfer Protocol (HTTP) or any other appropriate Web protocols. In response to receiving a request from the customer's mobile device for the app, central computing system 38 outputs (90), to mobile device 72, data that enables the app to be installed on the customer's mobile device. The app, once installed, may generate a graphical display on the mobile device that allows the customer to purchase, pay for goods, and schedule delivery of those goods as described herein.

The app may be configured to list goods that are available for purchase, to link to one or more retail (or other) Web sites having goods available for purchase and loading, and/or to show images of goods available for purchase. The app may also be configured to receive images of goods captured, for example, using the mobile device's camera and to send data representing the images to central computing system 38. Central computing system 38 may identify goods from the images that are available from participating enterprises, such as retail stores or malls, and request confirmation that the customer wishes to purchase the goods that are so identified.

In some implementations, app 77 provides the user with the ability to select from among multiple retails store to purchase an item. In this regard, in some implementations, all goods may be obtained from the same enterprise 73—for example, from the same "big box" store. In some implementations, the goods may be obtained from multiple different enterprises. For example, the system may be implemented in a shopping mall or plaza containing a number or retail stores, restaurants, or other enterprises containing various goods. In another example, the system may be implemented in connection with retail stores or other enterprises containing various goods that are not within physical proximity of each other. In this latter example, an autonomous vehicle, such as robot 10 or a self-driving truck, may be configured to travel over public or private roadways to reach each retail store to obtain goods from different retail stores or enterprises. In cases where goods are obtained from multiple different stores, there may be multiple loading stations, as described below. Central computing system 38 may determine the locations of the loading stations based on the customer's order and the availability of goods. Prices of the goods may also be a factor in determining where the goods should be purchased. In some implementations, the goods are merely transported; that is, they are not bought and paid for but rather are moved via the delivery system from one location to another location. This may occur, for example, in a college or company campus spread out over multiple locations that requires goods to be delivered from one building to another building.

In this example, the customer selects goods for purchase on the app 77's graphical display and provides payment information for the goods, such as a credit card number. In cases where selected goods are not available, the app may provide equivalent alternatives for purchase. Central computing system 38 receives (91) data from the app that identifies the goods and generates (92) information for the goods based on the data. For example, central computing system 38 may generate and output (93) data to the customer's mobile device 72 representing a proposed scheduled location and pick-up time for the goods. The pick-up time may be a window of minutes to hours, for example. The customer may confirm the scheduled location and pick-up time in the app and central computing system 38 may receive confirmation of the scheduled location and pick-up time. Central computing system 38 may also generate one or more orders for the goods that are identified by the data that it received from the app. The orders may identify the goods and contain payment information. The orders may be sent to a store or other enterprise where the goods can be purchased. For example, if all goods can be purchased from a single retail store, central computing system 38 may place the order with the store's computing system. At that store, the goods may be assembled for loading. if the goods are purchased from multiple retail stores, central computing system 38 may place an order with each store's computing system. The goods at each store may then be assembled for loading.

In some implementations, the app allows a user to provide a volume available to accommodate the goods. For example, the user may provide a volume of their car trunk where the goods are to be placed. The central computing system may receive data representing this volume and perform an optimization process to determine whether the volume of the goods selected will fit in the available volume. Central computing system 38 then outputs (94) to the app data indicating whether the volume is sufficient to accommodate the goods. If the volume is insufficient to accommodate the goods, the user may be asked to confirm whether they still wish to purchase the goods. In some implementations, the system may provide suggestions to the user as to which goods to omit from the order in order to meet any space constraints. The user may opt to follow the suggestions, select other goods to omit, or disregard the warning.

The order is assigned (95) a unique identifier, which is displayable on a graphical display device 52 as described previously. As explained, the unique identifier is associated with one or more columns of bins holding goods for the order. The number of bins needed to hold the goods is identified as described below. That information, and their placement, is sent to central computing system 38, which then controls the graphical display device(s) on the trailer(s) accordingly. In addition, the order is assigned a mechanism for unlocking the bins. For example, the customer may be sent (96) a barcode, a QR code, an NFC tag, a password, an update to a physical card, or any other appropriate mechanism that is usable to unlock the bins as described above.

Central computing system 38 allocates (97) a number of bins needed for the goods based on the data received from the mobile device that identifies goods. For example, central computing system 38 may determine the total volume of each type of goods for different bins—for example, frozen goods for freezing bins and perishable goods for refrigerated bins. Central computing system 38 may compare these volumes to bin volumes and then allocate the bins accordingly. As previously explained, bins for an order may be arranged in vertical columns. One or more vertical columns may be for the same order depending upon its size. The placement of the bins in the trailer compartments may be a function of the temperature of the bins. In some cases, the same temperature bins may be placed in a single column. In some cases, bins having the lowest temperatures (e.g., freezing) are placed in the bottom compartments and bins having the highest temperatures (e.g., ambient) are placed at the top. Availability of heating and cooling units for the various bins is also taken into consideration in determining where to place the bins on the trailer or trailers.

Bin allocation may also be based on one or more rules, which may be definable by an administrator of the system and may be user-customizable. For example, the rules may specify which goods are to be placed in which type of climate-controlled bin. For example, fresh vegetables may assigned refrigerated bins having a high humidity. Frozen goods are assigned to freezing bins, and so forth. In some implementations, the rules may also specify stacking of goods within individual bins based, for example, on the goods' fragility or size. For example, eggs or other breakables may be assigned to the top of an individual bin stack whereas flour or other non-breakables may be assigned to the bottom of an individual bin stack. In other examples, all liquids may be assigned to the same bin, all boxed items may be assigned to the same bin, and so forth.

Central computing system 38 identifies (98) the locations of one or more loading stations based on the customer's order. Locations of loading stations for each participating enterprise may be stored in computer memory in the central computing system 38, in computer memory in the robot's control system 36, or in computer memory in both systems. By way of example, if the order can be fulfilled at a single retail store, the loading station will be the loading station for that single retail store. The location of that loading station may be retrieved from memory. A loading station location may be specified in terms of coordinates or a route. If the order is to be fulfilled by multiple retail stores, the loading stations will be the loading stations for each of those stores. In that case, the location of each loading station may be retrieved from memory. The app may allow a user to specify the stores from which goods are to be purchased, which also dictates the locations of the loading stations.

A loading station may be inside of a store's building or outside of the building. Inside locations may require navigation through the inside of the building, which may be implemented as described previously. The pick-up station is typically outside, for example, curbside or in a store parking lot. In some implementations—for example, where the autonomous vehicle is a self-driving car or truck—the pick-up station may be at the customer's residence. In some cases, the customer may select a preferred pick-up station through the app. In any case, the pick-up station typically requires outdoor navigation, which may be implemented as described previously.

Central computing system 38 is configured to identify (99) which robots in the fleet have enough bin space to accommodate a customer's order. This may be done as described previously, for example, detecting goods released followed by bin door closed. Central computing system 38 selects (100) a robot and connected trailer to fulfill the order. In some cases, a robot having empty bins is selected. Central computing system 38 then instructs (101) the robot's control system 36 to move the robot to the loading station 74. If more than one loading station is involved, central computing system 38 instructs the robot's control system 36 to move the robot to each loading station. For example, the central computing system may plan a route to the multiple loading stations beforehand and instruct the robot's control system to follow the route without further instruction. For example, the central computing system may instruct the robot's control system to move the robot to a first loading station, wait for confirmation from the robot's control system that goods have been loaded at the first loading station, instruct the robot's control system to move the robot to a next loading station, wait for confirmation from the robot's control system that goods have been loaded at the next loading station, and so forth until all of the goods in the order have been loaded into the bins. The customer pick-up schedule is taken into account and is determined by the amount of loading and robot movement required to fulfill the order and other orders that may be serviced by the same robot/trailer combination.

At a loading station (or stations) the goods may be loaded into the bins manually or automatically. For example, in some implementations, the good may be placed on a conveyor and loaded from the conveyor into the bins using one or more pick-and-place robots. In implementations that have multiple loading stations, one or more loading stations may be manual and one or more loading stations may be automated. In some cases, a single store may have multiple loading stations organized, for example, by department. In such cases, all of the loading stations may be automated, all of the loading stations may be manual, or one or more loading stations may be manual and one or more loading stations may be automated.

Central computing system 38 may determine (102) that all of the goods have been loaded into the bins based on information provided by a store's computing system, the robot's control system 36, and/or signals received from the bin door sensors such as sensor 68. For example, if the robot is to load goods at a single loading station only, receipt of a signal indicating that a bin door has been closed may indicate that all goods have been loaded into that bin. If all bin doors are opened then closed, then the central computing system may infer that all goods have been loaded into the bins. Likewise, data received from the store's computing system may instruct central computing system 38 that loading has been completed. The same information may be used where multiple loading stations are involved, except that the signals and/or information of the preceding type are received by the central computing system from each loading station.

After the bins have been loaded, central computing system 38 instructs (103) the robot's control system to move the robot to the pick-up station 75. As noted, the location of the pick-up station may be sent from central computing system 38 to the robot's control system 36 or that location may be stored in, or otherwise accessible to, the robot's control system 36. The robot performs outdoor navigation or a combination of indoor and outdoor navigation to reach the pick-up station by its scheduled time—for example, at the beginning of a pick-up window. Examples of pick-up stations described previously include curbside, a store parking lot, a customer's residence, or some other predesignated location. Once at the pick-up station, the robot waits for the customer to arrive, to open the bins using a mechanism described herein, to collect the goods, and the close the bins. If the customer opens a bin and does not close the bin, the bin may be configured to close automatically following a predefined duration. After the bins have been emptied or the scheduled window for pick-up expires, the robot may be instructed (104) to return to a loading station or any other appropriate location. In some implementations, a fleet of the robots may be controlled by the central computing system 38 and robot control system 36 so that as a robot containing empty bins leaves a pick-up station, another robot containing full bins arrives at that same pick-up station. In some examples, multiple pick-up stations may be in the same vicinity.

FIG. 5 depicts movement of robot 10 pulling two trailers 20, 23 between a loading station 74 of an enterprise 73 and a pick-up station 75 located proximate to a pick-up lane 80 in a parking lot 81 for enterprise 73. Robot movement 84 is depicted by arrows. As explained previously, bins 22 are loaded at loading station 74. Robot 10 is then controlled to move to pick-up station 75. There, the goods in the bins are released to the customer (not shown). Robot 10 then returns to loading station 22 and the process proceeds again as described herein.

In some implementations, central computing system 38 maintains a record that includes failure of a customer associated with a mobile device to obtain goods from the bins at a scheduled pick-up time. For example, the central computing system may store the media access control (MAC) address and/or the Internet Protocol (IP) address of that mobile device along with an indication that a customer has failed to pick-up an order. If the number of failures exceeds a predefined threshold, the customer may be restricted in their use of the system or prevented from using the system.

The systems and techniques described herein may be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing at least part of the operations described herein can be performed by one or more programmable processors executing one or more computer programs to perform the functions described herein. At least part of the operations can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any mechanical or electrical connection herein may include a direct physical connection or an indirect connection that includes intervening components.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A system comprising:
   a computing system comprised of computer memory storing instructions that are executable and one or more processing devices for executing the instructions to perform operations comprising: receiving data from a user device that identifies goods, and generating information representing the goods based on the data;

bins configured to hold the goods represented by the information, the bins being climate-controllable to accommodate the goods; and an autonomous vehicle configured to transport the bins, the autonomous vehicle being configured to navigate from a loading station where at least some of the goods are received in the bins to a pick-up station where the goods are released from the bins;

wherein the operations further comprise:
determining volumes of different types of the goods;
comparing the volumes to volumes of the bins;
allocating the bins to types of the goods based on the comparing;
maintaining a record that includes failure of a customer associated with the user device to obtain the goods at a scheduled pick-up time, the record comprising an identifier associated with the customer, wherein the record comprises information associated with the user device; and
restricting access of the customer associated with the user device to the goods if the record indicates that the customer has failed to obtain the goods at the scheduled pick-up time more than a predefined number of times;

wherein the loading station is one of multiple loading stations; and wherein, prior to navigating to the pick-up station, the autonomous vehicle is controlled to navigate to the multiple loading stations to pick-up goods from the multiple loading stations.

2. The system of claim 1, further comprising:
a display device associated with the bins;
wherein the operations comprise:
associating a unique identifier with the goods; and
outputting data representing the unique identifier to the display device for rendering the unique identifier on the display device.

3. The system of claim 1, further comprising:
a scanner to read graphical codes;
wherein the operations comprise:
generating data representing a graphical code, the graphical code being associated with the goods; and
outputting the data representing the graphical code to the user device.

4. The system of claim 3, wherein the bins are unlockable using the graphical code; and
wherein the scanner is configured to read the graphical code from the user device and to control the bins to unlock in response to reading the graphical code.

5. The system of claim 1, further comprising:
a proximity reader to read data from a device;
wherein the operations comprise:
generating data representing a near-field communication (NFC) tag that is associated with the goods; and
sending the data representing the NFC tag to the user device.

6. The system of claim 5, wherein the bins are unlockable using the NFC tag; and
wherein the proximity reader is configured to read the NFC tag from the user device and to control the bins to unlock in response to reading the NFC tag.

7. The system of claim 1, further comprising:
a card reader to read information encoded on a physical card;

wherein the card reader is configured to read the information from the physical card and to control the bins to unlock in response to reading the information from the physical card.

8. The system of claim 1, wherein the operations comprise outputting, to the user device, data for an application that is executable on the user device to produce a graphical display; and
wherein the data received from the user device that identifies goods is received from the application.

9. The system of claim 1, wherein the user device comprises a mobile device that is independent of an enterprise containing the loading station and the pick-up station.

10. The system of claim 1, wherein the user device is a component of an enterprise containing the loading station and the pick-up station.

11. The system of claim 1, wherein climate control of the bins comprises temperature control such that at least two of the bins are maintained at different temperatures, with at least one bin being maintained at a temperature to accommodate perishable goods and at least one bin being maintained at a temperature to accommodate non-perishable goods.

12. The system of claim 1, wherein climate control of the bins comprises temperature control such that a first bin among the bins is maintained at ambient temperature, a second bin among the bins is refrigerated, and a third bin among the bins is maintained at or below 0° Celsius.

13. The system of claim 12, further comprising:
a trailer to hold the bins;
wherein the autonomous vehicle is connected to the trailer to move the trailer holding the bins from the loading station to the pick-up station; and
wherein the first bin is above the second bin in the trailer and the second bin is above the third bin in the trailer.

14. The system of claim 1, wherein climate control of the bins comprises humidity control.

15. The system of claim 1, wherein a bin among the bins comprises a door to access goods within the bin;
wherein the door comprises a sensor to detect that the door is closed; and
wherein the sensor outputs a signal when the door is closed to indicate that the goods have been released.

16. The system of claim 1, wherein navigating from the loading station to the pick-up station is performed, at least in part, using a global positioning system (GPS).

17. The system of claim 1, wherein navigation from the loading station to the pick-up station is performed, at least in part, by reference to a map stored in computer memory, the map being of at least part of space to be traversed between the loading station and the pick-up station and comprising reference points within the space.

18. The system of claim 1, wherein the operations comprise outputting, to the user device, data for an application that is executable on the user device to produce a graphical display;
wherein the application enables specifying the locations associated with the multiple loading stations; and
wherein the operations comprise receiving data representing the locations from the application.

19. The system of claim 1, wherein the loading station comprises robotics to put goods in at least some of the bins.

20. The system of claim 1, wherein a first loading station among the multiple loading stations is automated for putting goods in at least some of the bins and a second loading station among the loading stations is manual for putting goods in at least some of the bins.

21. The system of claim 1, wherein the operations comprise:
   outputting data representing a scheduled pick-up time to the user device; and
   receiving confirmation of the scheduled pick-up time from the user device.

22. The system of claim 21, wherein the information associated with the user device comprises an Internet Protocol (IP) address or a Media Access Control address of the user device.

23. The system of claim 1, further comprising a trailer to hold the bins;
   wherein the autonomous vehicle is connected to the trailer to move the trailer holding the bins from the loading station to the pick-up station;
   wherein the trailer includes protection from the environment; and
   wherein the autonomous vehicle comprises wheels having rugged tread tires configured for outdoor travel.

24. The system of claim 1, wherein the loading station is in-store and the pick-up station is outside of a store.

25. The system of claim 24, wherein the pick-up station is at a customer residence.

26. The system of claim 1, wherein the operations comprise outputting, to the user device, data for an application that is executable on the user device to produce a graphical display;
   wherein the graphical display is configured to enable a user to select the pick-up station; and
   wherein data representing the pick-up station is received and is usable to navigate from the loading station to the pick-up station.

27. The system of claim 1, wherein the operations comprise outputting, to the user device, data for an application that is executable on the user device to produce a graphical display; and
   wherein the graphical display is configured to provide alternatives to the goods based on availability of the goods.

28. The system of claim 1, wherein the operations comprise outputting, to the user device, data for an application that is executable on the user device to produce a graphical display;
   wherein the graphical display is configured to receive images of the goods; and
   wherein the data received from the user device that identifies goods comprises the images or data based on the images.

29. The system of claim 1, wherein at least one of the bins is associated with a temperature detector and a refrigeration system; and
   wherein the refrigeration system is controllable based on the temperature detected by the temperature detector.

30. The system of claim 1, wherein the bins are locked; and
   wherein the operations comprise:
      identifying a location of the user device based on global positioning system (GPS) data; and
      controlling the bins to unlock based on the GPS data.

31. The system of claim 1, wherein the operations comprise allocating a number of the bins needed for the goods based on the data received from the user device that identifies goods.

32. The system of claim 31, wherein allocating the number of bins is also based on one or more rules that are definable by an administrator.

33. The system of claim 1, wherein the loading station is associated with a retail store and the pick-up station is curbside.

34. The system of claim 1, further comprising:
   a temperature sensor to sense an environmental temperature;
   wherein climate control of the bins is adaptive based on the environmental temperature.

* * * * *